(12) United States Patent
Bedau

(10) Patent No.: US 11,750,379 B2
(45) Date of Patent: Sep. 5, 2023

(54) SECURE OPTICAL COMMUNICATION LINK

(71) Applicant: Western Digital Technologies, Inc., San Jose, CA (US)

(72) Inventor: Daniel Bedau, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 347 days.

(21) Appl. No.: 16/899,536

(22) Filed: Jun. 11, 2020

(65) Prior Publication Data
US 2021/0391988 A1 Dec. 16, 2021

(51) Int. Cl.
*H04L 9/08* (2006.01)
*H04B 10/27* (2013.01)
*G06F 13/42* (2006.01)
*G06F 21/60* (2013.01)

(52) U.S. Cl.
CPC ........ *H04L 9/0858* (2013.01); *G06F 13/4282* (2013.01); *G06F 21/602* (2013.01); *H04B 10/27* (2013.01)

(58) Field of Classification Search
CPC . H04L 9/0858; G06F 13/4282; G06F 21/602; H04B 10/27
See application file for complete search history.

(56) References Cited

U.S. PATENT DOCUMENTS

| | | |
|---|---|---|
| 8,751,828 B1 | 6/2014 | Raizen et al. |
| 9,257,114 B2 | 2/2016 | Tanaka |
| 10,158,481 B2 | 12/2018 | Bunandar et al. |

(Continued)

FOREIGN PATENT DOCUMENTS

| | | |
|---|---|---|
| CA | 2623575 | 5/2012 |
| JP | 5126479 | 11/2012 |
| WO | 2016/093610 | 6/2016 |

OTHER PUBLICATIONS

Bunandar, D. et al., "Metropolitan Quantum Key Distribution with Silicon Photonics", American Physical Society, Physical Review X 8, 021009 (2018).

(Continued)

*Primary Examiner* — Noura Zoubair
*Assistant Examiner* — Zoha Piyadehghibi Tafaghodi
(74) *Attorney, Agent, or Firm* — PATENT LAW WORKS LLP

(57) ABSTRACT

This disclosure relates to secure optical communication links. In particular, this disclosure relates to data storage devices, random access memories, host interfaces, and network layers that comprise a secure optical communication link. A data storage device comprises an optical data port to connect to an optical communication link external to the data storage device and a non-volatile storage medium to store user content data received over the optical communication link. A controller controls access to the user content data stored on the non-volatile storage medium. A cryptography engine uses a cryptographic key to perform cryptographic operations on data sent and received through the optical data port. An optical key distribution device coupled to the optical data port performs quantum key distribution over the optical communication link to provide the cryptographic key to the cryptography engine.

19 Claims, 4 Drawing Sheets

(56) References Cited

U.S. PATENT DOCUMENTS

| | | | |
|---|---|---|---|
| 10,541,809 B2 | 1/2020 | Godfrey et al. | |
| 2007/0192598 A1* | 8/2007 | Troxel | H04L 9/0852 713/168 |
| 2011/0170690 A1* | 7/2011 | Shpantzer | H04L 9/0858 380/256 |
| 2013/0191648 A1 | 7/2013 | Bursell | |
| 2016/0191235 A1 | 6/2016 | Kim et al. | |
| 2016/0285629 A1* | 9/2016 | Tanizawa | H04L 9/0852 |
| 2016/0352515 A1* | 12/2016 | Bunandar | H04L 9/0852 |
| 2017/0214525 A1* | 7/2017 | Zhao | H04W 12/0431 |
| 2017/0331623 A1* | 11/2017 | Fu | H04B 10/85 |
| 2019/0340136 A1* | 11/2019 | Irwin | G06F 3/0608 |
| 2020/0050959 A1* | 2/2020 | Ashrafi | G06N 3/0635 |
| 2020/0092089 A1* | 3/2020 | Takahashi | H04L 9/0852 |
| 2020/0213102 A1 | 7/2020 | Rahamim et al. | |

OTHER PUBLICATIONS

Miacinnis, J., "Enabling low-cost quantum key distribution" Retrieved online, URL: <https://www.ece.utoronto.ca/news/enabling-low-cost-quantum-key-distribution/>, accessed on Oct. 7, 2019.

Whitwam, R., "Google Announces 'Bristlecone' Quantum Computing Chip" Retrieved online, URL: <https://www.extremetech.com/extreme/265105-google-announces-bristlecone-quantum-computing-chip>, accessed on Oct. 7, 2019.

Jarczynski, M., et al., "Planar-Integrated Free-Space Optics as Interconnection Technology—Principle and Demonstration", Round Table Meeting on: Optical Interconnects for High Throughput on Board Processors, Optical Information Technology, Feb. 9, 2006.

NVM Express, "NVM Express over Fabrics" Revision 1.0a, Jul. 17, 2018.

Ji, H.C., et al., "Optical Interface Platform for DRAM Integration", Optical Fiber Communication Conference and Exposition and the National Fiber Optic Engineers Conference, 2011.

Hadke, A., et al., "Design and Evaluation of an Optical CPU-DRAM Interconnect", IEEE International Conference on Computer Design, 2008.

"NVMe over Fabrics Session A12 Part B", Flash Memory Summit, 2017.

Colp, P., et al., "Protecting Data on Smartphones and Tablets from Memory Attacks", ASPLOS 15: Proceedings of the Twentieth International Conference on Architectural Support for Programming Languages and Operating Systems, Mar. 2015.

Trikalinou, A., et al., "Taking DMA Attacks to the Next Level: How to do arbitrary reads/writes in a live unmodified system and using a rogue memory controller", Jul. 22-27, 2017.

Van Der Veen, V., et al., GuardION: Pratical Mitigation of DMA-based Rowhammer Attacks on ARM, Detection of Intrusions and Malware, and Vulnerability Assessment (pp. 92-113), 15th International Conference, DIMVA 2018, Jun. 28-29, 2018.

Blass, E. O., et al., "Tresor-Hunt: Attacking CPU-Bound Encryption", Proceedings of the Annual Computer Securities Applications Conference (ACSAC), Dec. 2012.

Tatar, A., et al., Throwhammer: Rowhammer Attacks over the Network and Defenses, Proceedings of the 2018 USENIX Annual Technical Conference (USENIX ATC '18), Jul. 11-13, 2018.

Kaplan, D., et al., "AMD Memory Encryption", White Paper, Apr. 21, 2016.

Beamer, S., et al., "Re-Architecting DRAM Memory Systems with Monolithically Integrated Silicon Photonics", ISCA 10: Proceedings of the 3th Annual International Symposium on Computer Architecture, Jun. 2010 (pp. 129-140).

Hamedazimi, N., et al., "FireFly: A Reconfigurable Wireless Data Center Fabric Using Free-Space Optics", ACM SIGCOMM Computer Communication Review, Aug. 2014.

Grimsley, H., et al., "An adaptive variational algorithm for exact molecular simulations on a quantum computer", Nature Communications 2019.

Pollock, D., "Google's Quantum Computing Breakthrough Brings Blockchain Resistance Into the Spotlight Again" Retrieved online, URL: <https://www.forbes.com/sites/darrynpollock/2019/09/24/googles-quantum-computing-breakthrough-brings-blockchain-resistance-into-the-spotlight-again>, accessed on Sep. 24, 2019.

Tallis, B., "Marvell at FMS 2019: NVMe Over Fabrics Controllers, AI on SSD" Retrieved online, URL: <https://www.anandtech.com/show/14748/marvell-at-fms-2019-nvme-over-fabrics-controllers>, accessed on May 26, 2020.

Sinzinger, S., et al., "Integrated micro-optical imaging system with a high interconnection capacity fabricated in planar optics", Applied Optics, vol. 36, Issue 20 (pp. 4729-4735), 1997.

Fey, D., et al., "Optical Interconnects for Neural and Reconfigurable VLSI Architectures", Proceedings of the IEEE, vol. 88, No. 6, Jun. 2000.

Lukowicz, P., et al., "Optoelectronic Interconnection Technology in the HOLMs System", IEEE Journal on Selected Topics in Quantum Electronics, vol. 9, No. 2, Mar./Apr. 2003.

Johnston, Hamish., "Encryption kicks off in the quantumStadium", Physics World, Everyday Science Blog, May 27, 2010, Retrieved online, URL: <https://physicsworld.com/a/playing-in-the-quantumstadium/>, accessed on May 26, 2020.

Arute, F., et al., "Quantum supremacy using a programmable superconducting processor", Nature, vol. 574, Oct. 24, 2019 (pp. 505-511).

Liu, L., et al., "Practical quantum key distribution with non-phase-randomized coherent states", Phys. Rev. Applied 12, 024048—Published Aug. 22, 2019.

Laudenbach, F., et al., "Continuous-Variable Quantum Key Distribution with Guassian Modulation—The Theory of Practice Implementations", Advanced Quantum Technologies, Mar. 2017.

Yin, H. L., et al., "Coherent-State-Based Twin Field Quantum Key Distribution", Nature, Scientific Reports, 2019.

Cobourne, "Quantum key distribution protocols and applications," Department of Mathematics, Royal Holloway, University of London, Surrey, England, Mar. 8, 2011, retrieved from https://www.ma.rhul.ac.uk/static/techrep/2011/RHUL-MA-2011-05.pdf on May 18, 2021, 95 pgs.

International Search Report and Written Opinion for International Application No. PCT/US2021/019302, dated May 19, 2021, 13 pgs.

* cited by examiner

SECURE OPTICAL COMMUNICATION LINK

TECHNICAL FIELD

This disclosure relates to secure optical communication links. In particular, this disclosure relates to data storage devices, random access memories, host interfaces, and network layers that comprise a secure optical communication link.

BACKGROUND

Demand for data storage has risen significantly in the recent past. As a result, more sophisticated data storage solutions become available. In particular, optical links become more common to transfer data to and from data storage devices.

However, a major concern with such links is data security, as it is often difficult to securely exchange encryption keys. Further, in some applications, it is not practical to store user content data in encrypted form because the data needs to be accessed from various different systems that may not have the required cryptographic keys available. Further, as data storage architectures become more distributed, eavesdropping becomes a risk that compromises the security of cryptographic key distribution.

Therefore, there is a need for a more secure optical communication link for data storage devices, random access memories, host interfaces, and network layers.

SUMMARY

This disclosure provides an optical device that is integrated with a data storage device, random access memory, host interface, or network layer. The optical device performs quantum key distribution over the optical data link that is also used to communicate the user content data stored on the storage device, random access memory, or host interface. After the cryptographic keys are exchanged in the quantum secure way, conventional cryptography can be used to secure the optical communication channel. An additional network layer enables the discovery of quantum key distribution capabilities, key agreement on the physical layer and cryptography functions.

Disclosed herein is a data storage device comprising an optical data port configured to connect to an optical communication link external to the data storage device and a non-volatile storage medium configured to store user content data received over the optical communication link. The data storage device further comprises a controller configured to control access to the user content data stored on the non-volatile storage medium; a cryptography engine configured to use a cryptographic key to perform cryptographic operations on data sent and received through the optical data port; and an optical key distribution device coupled to the optical data port and configured to perform quantum key distribution over the optical communication link to provide the cryptographic key to the cryptography engine.

In some embodiments, the controller is further configured to perform a protocol stack of Non-Volatile Memory Express over Fabrics.

In some embodiments, the protocol stack comprises features for discovery of a capability for quantum key distribution.

In some embodiments, the protocol stack comprises features for key negotiation.

In some embodiments, the optical key distribution device is manufactured as an integrated silicon device.

In some embodiments, the optical key distribution device comprises a Mach-Zehnder modulator with interleaved grating couplers.

In some embodiments, the optical key distribution device is further configured to perform quantum key distribution based on a polarization of a photon.

In some embodiments, the optical key distribution device is further configured to convert a polarization of the photon in the optical communication link into a path the photon takes in an integrated circuit.

In some embodiments, the optical key distribution device is further configured to perform quantum key distribution based on coherent states.

Disclosed herein is a method for communicating data stored on a data storage device. The method comprises receiving, by the data storage device, a discovery message for a key exchange capability over an optical communication link; in response to receiving the discovery message, performing quantum key distribution over the optical communication link to generate a cryptographic key at the data storage device; and performing cryptographic functions using the cryptographic key to secure data transmitted over the optical communication link.

In some embodiments, performing the cryptographic functions comprises encrypting and decrypting user content data stored on non-volatile memory.

In some embodiments, performing the cryptographic functions comprises encrypting and decrypting communications over the optical communication link.

In some embodiments, performing quantum key distribution comprises encoding quantum information onto a photon; and transmitting the photon over the optical communication link.

In some embodiments, performing quantum key distribution comprises sending classical digital data over the optical communication link, the classical digital data being indicative in relation to the encoded quantum information.

Disclosed herein is a data storage device comprising means for receiving, by the data storage device, a discovery message for a key exchange capability over an optical communication link; means for performing, in response to receiving the discovery message, quantum key distribution over the optical communication link to generate a cryptographic key at the data storage device; and means for performing cryptographic functions using the cryptographic key to secure data transmitted over the optical communication link.

Disclosed herein is a random access memory module comprising: an optical data port configured to connect to an optical communication link external to the random access memory module; a volatile random access memory configured to store user content data received over the optical communication link; a cryptography engine configured to use a cryptographic key to perform cryptographic operations on data sent and received through the optical data port; and an optical key distribution device coupled to the optical data port and configured to perform quantum key distribution over the optical communication link to provide the cryptographic key to the cryptography engine.

Disclosed herein is a host interface to provide communication between a host computer and a memory device. The host interface comprises an optical data port configured to connect to the memory device over an optical communication link external to the host interface; a cryptography engine configured to use a cryptographic key to perform cryptographic operations on data sent and received through the optical data port; and an optical key distribution device coupled to the optical data port and configured to perform quantum key distribution over the optical communication link to provide the cryptographic key to the cryptography engine.

Disclosed herein is a method for operating interconnected data storage devices. The method comprises determining whether key distribution capabilities are present at one of the interconnected data storage devices; in response to determining that the key distribution capabilities are present at one of the interconnected data storage devices, performing quantum key distribution over an optical communication link to generate a cryptographic key pair comprising a first key stored at a host computer and a second key stored at the one of the interconnected data storage devices; and performing cryptographic functions using the cryptographic key to secure data transmitted over the optical communication link.

In some embodiments, performing quantum key distribution comprises transmitting a photon with quantum information encoded thereon over the optical communication link.

In some embodiments, performing quantum key distribution comprises transmitting classical, digital data relating to the quantum information encoded on the photon.

BRIEF DESCRIPTION OF DRAWINGS

A non-limiting example will now be described with reference to the following drawings, in which.

DESCRIPTION OF EMBODIMENTS

Data Storage Device

Figure 1:
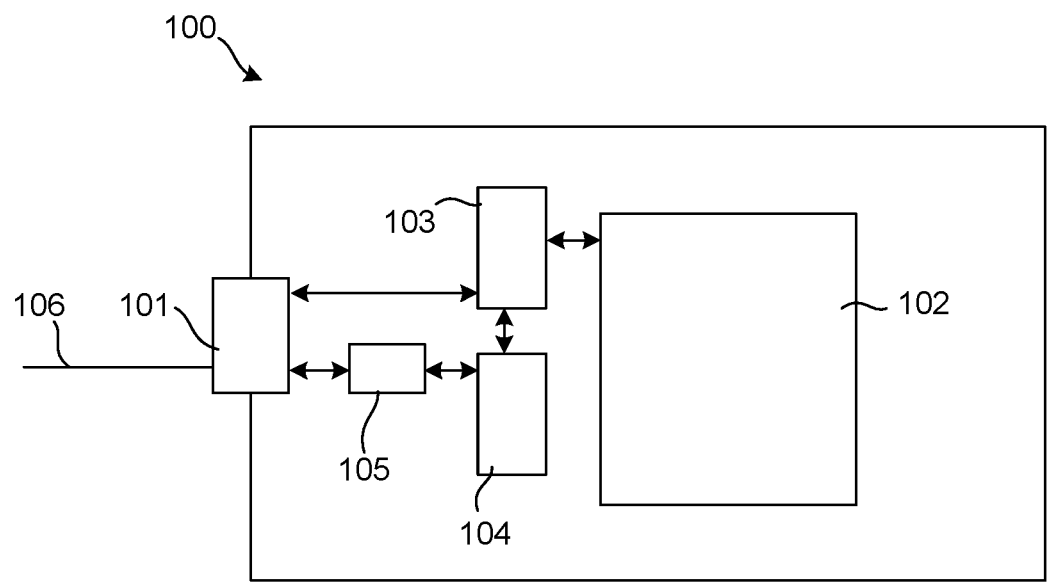
FIG. 1 illustrates a data storage device, according to an embodiment.

FIG. 1 illustrates a data storage device 100, according to an embodiment. Data storage device 100 comprises an optical data port 101, a non-volatile storage medium 102, a controller 103, a cryptography engine 104 and an optical key distribution device 105.

Optical data port 101 is configured to connect to an optical communication link 106, such as an optical fiber cable, external to the data storage device. Herein, 'external' means that the optical communication link has at least one connection point or terminal that is physically outside an enclosure that houses the data storage device 100. For example, the optical data port 101 may be a small form-factor pluggable (SFP) network interface module that connects the data storage device to a Fibre Channel (FC) medium. Other physical layer options, such as InfiniBand are also possible as well as integrated waveguides. Further, the communication link may not require a physical fiber or other medium, such as in free space optics, as described below.

In some examples, the optical data port 101 is connected to an optical medium according to the Non-Volatile Memory Express (NVMe) specification or the Non-Volatile Memory Host Controller Interface Specification (NVMHCIS) specification. In particular, optical data port 101 may connect the data storage device 100 to a network of NVMe over Fabrics (NVMe-oF). This may include a switch fabric network topology. Used in this context, a "fabric" enables any-to-any connections among elements. A fabric may be distinguished from a network, which may restrict the connections possible among the attached elements.

Non-volatile storage medium 102 is configured to store user content data received over the optical communication link via optical data port 101. Storage medium may be a rotating magnetic disk as in a Hard Disk Drive (HDD), a NAND Flash medium as in a Solid State Drive (SSD), or an emerging memory device, such as Magnetic Random Access Memory (RAM), Phase Change Memory or Resistive RAM. Other storage media may be used.

Controller 103 is connected to optical port 101 and, in one embodiment, comprises a fiber optics to copper converter. Alternatively, the converter may be integrated with optical port 101. Controller 103 controls access, such as read and write access, to user content data stored on the non-volatile storage medium and implements a communication protocol to establish a connection to a communication party, such as a host computer or other NVMe-oF infrastructure, such as a Fibre Channel switch or a shelf controller. It is noted that NVMe bypasses some levels of code in the protocol stack of FC. However, other protocols may also be used. Controller 103 may implement a Remote Direct Memory Access (RDMA) protocol to establish a connection and receive commands including commands to read or write data to and from storage medium 102.

Cryptography

Cryptography engine 104 is configured to use a cryptographic key to perform cryptographic operations on data sent and received through the optical data port. The cryptographic operations may be symmetric with two identical secret keys, or asymmetric with a public key and a private key. Further, the cryptographic operations may be according to a cypher suite, such as Rivest-Shamir-Adleman (RSA), Data Encryption Standard (DES), Advanced Encryption Standard (AES), Blowfish, or others.

In the example of FIG. 1, cryptography engine 104 is connected to controller 103 and controller 103 sends cryptographic commands to cryptography engine 104 and receives the result from cryptography engine 103. For example, controller 103 provides all data that is to be sent via optical port 101 to be encrypted, receives the encrypted data from the cryptography engine 104 and sends the encrypted data over optical port. Vice versa, controller 103 receives encrypted data from optical port 101, provides the encrypted data to the cryptography engine 104 and receives the decrypted data from cryptography engine 104. Cryptography engine 104 may store the required keys on integrated non-volatile memory or receive the keys from controller 103.

In other examples, cryptography engine 104 is connected between the controller 103 and the optical port 101, which is also referred to as "in-line", and encrypts and decrypts all data communicated over optical data port 101 without any intervention from the controller 103. In other words, the controller 103 is agnostic to the presence of cryptography engine 104 as the controller 103 sends and receives unencrypted data.

This disclosure focusses on encryption and decryption of the communication on the external communication link 106, such as the fiber optical cable. However, any keys distributed according to the methods disclosed herein can equally be used for encrypting and decrypting user content data stored on storage medium 102.

An optical key distribution device 105 is coupled to the optical data port 101 such that it receives the optical signal sent through the communication link 106. The optical key distribution device 105 is configured to perform quantum key distribution over the optical communication link to provide the cryptographic key to the cryptography engine.

Quantum Key Distribution Process

In one example, the quantum key distribution process exploits quantum indeterminacy. In this sense, quantum information in a physical system, such as a photon, can only be measured once. The quantum measurement collapses the quantum state and results in a measurement of one of two possible outcomes. This means that an eavesdropper who intercepts the carrier of the quantum information, such as the photon, destroys the encoded quantum information by measuring it.

Further, quantum information can be encoded onto photons in different bases. In particular, there are two conjugate bases, which could be considered 'orthogonal' for illustration. If quantum information is encoded onto a photon in the first basis, it can be measured in the first basis. Measuring in the second, 'orthogonal' basis will yield a random result.

This principle can be used by two parties 'Alice' and 'Bob'. Alice creates a random bit (0 or 1) and then randomly selects one of her two bases (rectilinear or diagonal in this case) to transmit it in. She then prepares a photon polarization state depending both on the bit value and basis. Alice then transmits a single photon in the state specified to Bob, using the quantum channel. This process is then repeated from the random bit stage, with Alice recording the state, basis and time of each photon sent. As Bob does not know the basis the photons were encoded in, all he can do is to select a basis at random to measure in, either rectilinear or diagonal. He does this for each photon he receives, recording the time, measurement basis used and measurement result. After Bob has measured all the photons, he communicates with Alice over the public classical channel. Alice broadcasts the basis each photon was sent in, and Bob the basis each was measured in. They both discard photon measurements (bits) where Bob used a different basis, which is half on average, leaving half the bits as a shared key. To check for the presence of an eavesdropper, Alice and Bob now compare a predetermined subset of their remaining bit strings. If a third party (usually referred to as Eve, for "eavesdropper") has gained any information about the photons' polarization, this introduces errors in Bob's measurements. Other environmental conditions can cause errors in a similar fashion. If more than p bits differ they abort the key and try again, possibly with a different quantum channel, as the security of the key cannot be guaranteed. p is chosen so that if the number of bits known to Eve is less than this, privacy amplification can be used to reduce Eve's knowledge of the key to an arbitrarily small amount at the cost of reducing the length of the key.

In other examples, different schemes can be used, such as schemes relying on entangled pairs of photons, such as the Artur Ekert scheme according to the E91 protocol as described in Ekert, Artur K. (5 Aug. 1991). "Quantum cryptography based on Bell's theorem". Physical Review Letters. 67 (6): 661-663 or continuous variable schemes, such as Gaussian modulation.

Quantum Key Distribution Hardware

In one example, the optical key distribution device 105 comprises a Mach-Zehnder modulator (MZM) with interleaved grating couplers, which convert the polarization of a photon in the optical fiber into the path the photon takes in the integrated circuit, and vice versa.

Figure 2:
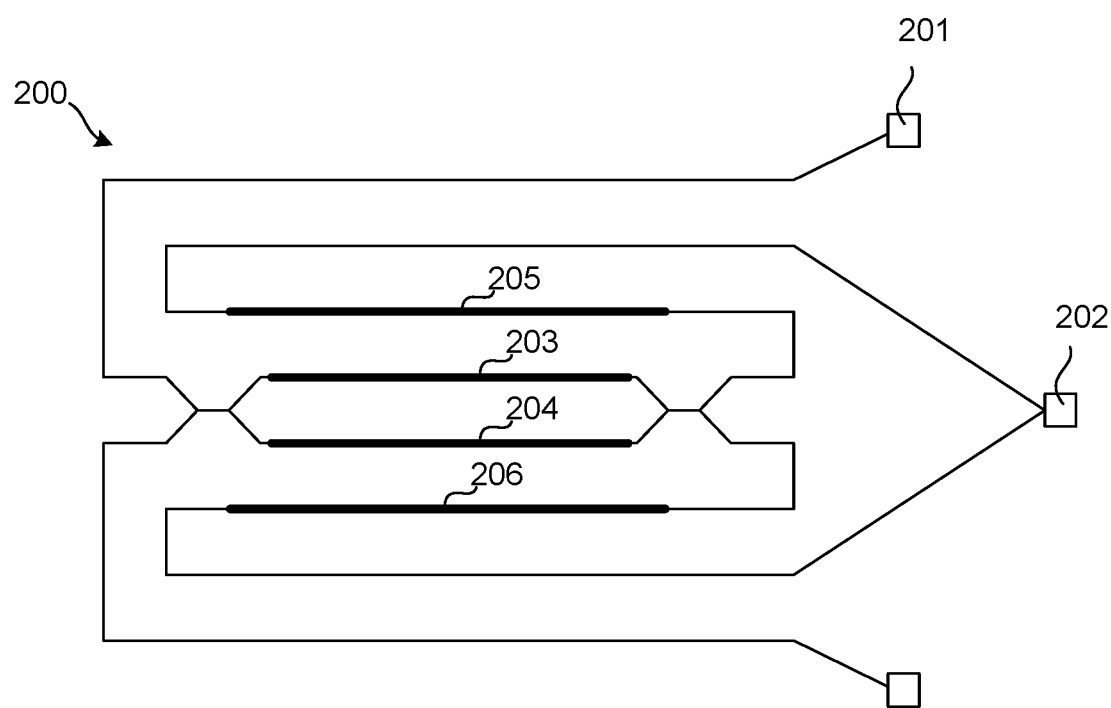
FIG. 2 illustrates a Mach-Zehnder modulator implemented as a photonic integrated circuit, according to an embodiment.

FIG. 2 illustrates an MZM 200, according to an embodiment, in the form of a photonic integrated circuit (PIC). MZM 200 comprises an input 201 and an output 202 as well as internal phase modulators 203/204 and external phase modulators 205/206. Light is coupled in and out of the encoder using a fiber V-groove array of 250-μm pitch. Polarization grating couplers are used to convert between polarization encoding in the input-output fibers and path encoding within the PIC. The unitary transformation is similar to that of a polarizing beam splitter (PBS). Within the PIC, the photons' paths—and their relative phases—are manipulated using MZM 200 with the two internal 203/204 and the two external electro-optic phase modulators 205/ 206, which in turn manipulate the photon polarization in the output fiber. The input polarization grating coupler separates light from the horizontal and vertical polarizations onto two different paths, both in the transverse-electric (TE) polarization: with its electric field oscillating parallel to the chip surface. Any light inadvertently converted into the transverse-magnetic (TM) polarization in these waveguides is greatly attenuated by the phase modulators, which strongly support higher transmission in TE polarization over TM polarization.

The electro-optic phase modulators 203/204/205/206 in the MZM 200 are based on depletion-mode free-carrier dispersion from a doped p-i-n junction superimposed on the optical mode. The overlap between the optical mode and the free carriers results in free-carrier refraction, which can be controlled with gigahertz radio frequency signals to achieve high-speed phase modulation.

In one example, controller 103 uses MZM 200 to perform a Bennett-Brassard 1984 (BB84) quantum key distribution (QKD) protocol. Accordingly, a first party 'Alice' prepares three quantum states: two eigenstates of Z and an eigenstate of X. Alice randomly chooses the basis she prepares in. When the Z basis is selected, Alice prepares either $|0_z\rangle=H$ or $|1_z\rangle=V$ with equal probabilities of ½. Otherwise, when the X basis is selected, Alice prepares the state $|0_x\rangle|D\rangle = (|H\rangle+|V\rangle)/\sqrt{2}$.

The internal 203/204 and external 205/206 phase modulators can be configured to produce the state $(|t\rangle+|b\rangle)/\sqrt{2}$ which is taken to be $|0_z\rangle$. Radio frequency (RF) signals of differing voltages are applied to one of the external phase modulators to generate $(|t\rangle+e^{i\phi}|b\rangle)/\sqrt{2}$, where $\phi$ is the applied phase shift. All of the three BB84 states can be generated by applying the phase shifts $\phi=0$, $\pi/2$, and $\pi$.

Bob receives the signal, such as with a device that is similar to the optical key distribution device 105, and transforms it back into the original coordinate system by a suitable polarization controller. Here not only an arbitrary polarization is to be transformed into a desired one (0°) but also the phase shift between this polarization (0°) and its orthogonal (90°) is controlled. Such a polarization controller would have three degrees of freedom. An implementation with a tracking speed of 20 kiloradians per second (krad/s) on the Poincaré sphere is described in Koch, B.; Noe, R.; Mirvoda, V.; Sandel, D.; et al. (2013). "20 krad/s Endless Optical Polarisation and Phase Control". Electronics Letters. 49 (7): 483-485, and B. Koch, R. Noé, V. Mirvoda, D. Sandel, First Endless Optical Polarization and Phase Tracker, Proc. OFC/NFOEC 2013, Anaheim, Calif., Paper OTh3B.7, Mar. 17-21, 2013. This way the whole normalized Stokes space is stabilized, i.e. the Poincaré sphere rotation by fiber birefringence is undone.

As mentioned above, optical key distribution device 105 comprising MZM 200 may be fabricated as a photonic integrated circuit. This means that MZM is fabricated on a silicon substrate, such as by creating the meander shape shown in FIG. 2 out of waveguides by appropriately doping the silicon substrate. The substrate can then be further used to create additional circuitry on the same substrate, such as analog or digital logic circuitry, such as application specific integrated circuits (ASICs) or general purpose processors. The advantage is that the resulting optical key distribution device 105 is small enough to be integrated into form factors of data storage devices. Further, the fabrication of optical key distribution device 105 may only contribute a small amount of extra costs, which enables the use of quantum key distribution for a large number of devices. This is particularly useful in fabrics-based storage architectures, such an NVMe-oF, where a large number of devices are interconnected.

Coherent States

In a further example, the optical key distribution device 105 is configured to perform quantum key distribution based on coherent states. A coherent state refers to a state of the quantized electromagnetic field of a photon that describes a maximal kind of coherence and a classical kind of behaviour. Optical key distribution device 105 may further be configured to perform continuous-variable quantum key distribution (CV-QKD) with Gaussian modulation.

In a Gaussian-modulated scenario Alice prepares displaced coherent states with quadrature components q and p that are realizations of two independent and identically distributed (i.i.d.) random variables Q and P. The random variables Q and P obey the same zero-centered normal distribution. After preparation of each coherent state Alice transmits $|\alpha_j\rangle$ to Bob through a Gaussian quantum channel. Bob uses homodyne or heterodyne detection to measure the eigenvalue of either one or both of the quadrature operators.

Sifting: In some variants of CV-QKD Alice and Bob select the bases which they use to prepare and measure states, resp., by using independently and uniformly generated random bits. In these cases the sifting step eliminates all (uncorrelated) signals where different bases have been used for preparation and measurement. In variants of CV-QKD where Alice and Bob use both bases simultaneously no sifting is performed.

Parameter Estimation: After transmitting a sequence of states Alice and Bob will reveal and compare a random subset of the data that was sent and the corresponding measurements. This comparison enables them to estimate the total transmission and excess noise of the channel by which they are able to compute their mutual information $I_{AB}$ and bound Eve's information $\chi$. If $\chi$ turns out to be greater than $\beta I_{AB}$ the protocol aborts at this point.

Information Reconciliation: Otherwise, if $\beta I_{AB} > \chi$, Alice and Bob will perform information reconciliation which is a form of error correction. One-way information reconciliation where one party sends information on her key to the other party can be carried out in two different ways: Either Bob corrects his bits according to Alice's data (direct reconciliation) or Alice corrects her bits according to Bob's data (reverse reconciliation). In the case of forward reconciliation, for a total transmittance of $T_{tot} < 0.5$ ($\approx -3$ dB), Eve potentially has more information on what Alice prepared than Bob has, hence no secret key can be distilled (assuming that Eve can use the entire loss for her own benefit). This 3 dB loss limit can be overcome by using reverse reconciliation, where Bob sends the correction information to Alice who thereupon corrects her bit string according to Bob's. In this scenario Bob's data is primary, and since Alice's information on Bob's measurement results is always greater than Eve's, the mutual information $I_{AB}$ can remain greater than $\chi$ for any total transmission T (of course, the lower T is the more critical will the excess noise $\xi$ become).

Confirmation: After information reconciliation Alice and Bob perform a confirmation step using a family of (almost) universal hash functions to bound the probability that error correction has failed: Alice or Bob choose with uniform probability one particular hash function from the family and transmits the choice to the partner. Both apply that hash function to their key to obtain a hash value. Subsequently, Alice and Bob exchange and compare their hash values. If the hash values are different the keys are different and they abort; if the hash values are equal they continue and know that they have obtained an upper bound on the probability that the keys are not identical. This error probability depends on the length of the hash values and of the type of hashing functions used.

Privacy Amplification: After successful confirmation Alice and Bob will share the same bit string with very high probability. However, Eve has a certain amount of information on the key. In order to reduce Eve's probability to successfully guess (a part of) the key to a tolerable value, Alice and Bob will perform a privacy amplification protocol by applying a seeded randomness extractor (algorithm) to their bit strings. Again a family of universal hash functions is typically used for that purpose.

Authentication: To avoid a man-in-the-middle attack by Eve, Alice and Bob authenticate their classical communication using a family of strongly universal hash functions.

More information can be found in the following references, which are incorporated by reference herein in their entirety:

Fabian Laudenbach, Christoph Pacher, Chi-Hang Fred Fung, Andreas Poppe, Momtchil Peev, Bernhard Schrenk, Michael Hentschel, Philip Walther, Hannes Hubei "Continuous-Variable Quantum Key Distribution with Gaussian Modulation—The Theory of Practical Implementations", Adv. Quantum Technol. 1800011 (2018).

Hua-Lei Yin, Zeng-Bing Chen: "Coherent-State-Based Twin-Field Quantum Key Distribution", Nature Scientific Reports, (2019) 9:14918.

Li Liu, Yukun Wang, Emilien Lavie, Arno Ricou, Chao Wang, Fen Zhuo Guo, Charles Ci Wen Lim: "Practical quantum key distribution with non-phase-randomized coherent states", Phys. Rev. Applied 12, 024048 (2019).

Optical Connection

Figure 3:
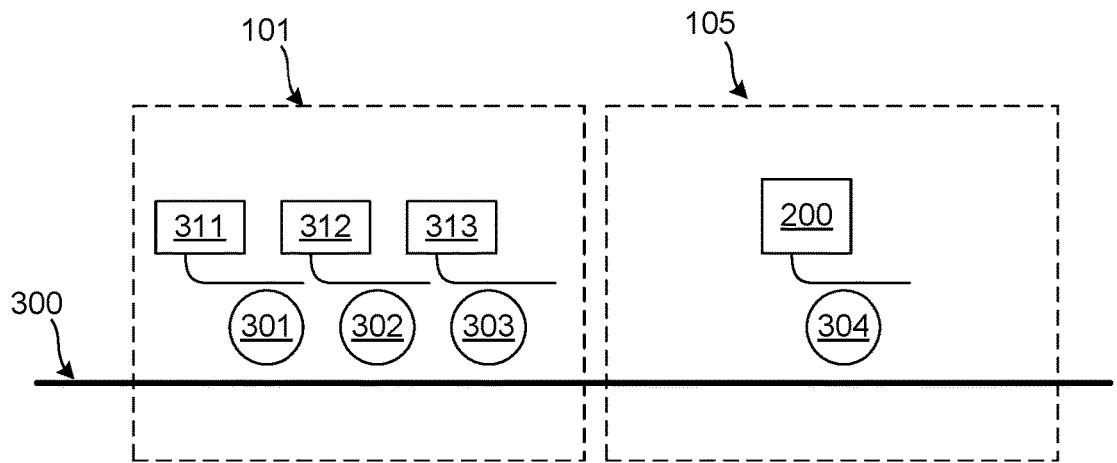
FIG. 3 illustrates a physical implementation of the optical port and the optical key distribution device from FIG. 1, according to an embodiment.

FIG. 3 illustrates a physical implementation of optical port 101 and optical key distribution device 105, according to an embodiment. The implementation comprises an optical fiber 300 which carries NVMe-oF commands and data to and from data storage device 100 (not shown). Optical port 101 comprises multiple optical ring resonators 301, 302, and 303 coupled to fiber 300. In this example there are three optical ring resonators 301, 302, and 303 but that number can be higher or lower for different applications and depending on the number of different wavelengths in use. Each of the three optical ring resonators 301, 302, and 303 is tuned to a specific wavelength in the fiber 300 and couples to that wavelength. As a result, a signal transmitted over fiber 300 at that wavelength is coupled to respective detectors 311, 312, and 313. These detectors 311, 312, and 313 are photodiodes which convert the optical signal into a digital voltage signal that can then be detected and processed by conventional electronics, such as access controller 103.

Optical key distribution device 105 comprises a further ring resonator 304 that couples the signal from fiber 300 to MZM 200. Ring resonator 304 may be tuned to the same wavelengths as one of resonators 301, 302, 303 or a different wavelength. Fiber 300 may be a northbound fiber for communication to data storage device 100 and there may be a southbound fiber (not shown) for communication from the data storage device 100. In some examples, optical key distribution device 105 comprises two MZMs comprising a first MZM for decoding quantum information received on the northbound fiber and a second MZM for encoding quantum information to be sent on the southbound fiber. For communications from data storage device 100, optical port may comprise optical drivers that convert a digital voltage signal into an optical pulse, which is then coupled onto fiber 300 or a separate southbound fiber via ring oscillator modulators (not shown).

Protocol

As mentioned above, controller 103 may implement a remote direct memory access (RDMA) protocol stack, such as NVMe-oF. Further, the quantum key distribution implemented in the optical key distribution device 105, operates over the same optical fiber as the RDMA protocol. Therefore, the NVMe-oF may be extended by additional key distribution functionality. In other words, the operations related to the key distributions are woven into the NVMe-oF protocol stack. More specifically, the operations disclosed herein occur in the top layer of the NVMe-oF stack relating to architecture where discovery enables a host computer to discover the quantum key capabilities of the data storage device 100. On the other hand, the actual quantum key distribution occurs at the bottom layer, which is the physical layer of the fabric, because the optical key distribution device 105 accesses the physical medium directly to exchange keys.

NVMe over Fabrics defines a discovery mechanism that a host may use to determine the NVM subsystems the host may access. A discovery controller supports minimal functionality and only implements the required features that allow a discovery log gage to be retrieved. A discovery controller does not implement I/O queues or expose namespaces. A discovery service is an NVM subsystem that exposes only discovery controllers. The discovery log page provided by a discovery controller contains one or more entries. Each entry specifies information used for the host to connect to an NVM subsystem via an NVMe transport. An entry may specify an NVM subsystem that exposes namespaces that the host may access, or a referral to another discovery service. The maximum referral depth supported is eight levels. The method that a host uses to obtain the information necessary to connect to the initial discovery service may be implementation specific. This information may be determined using a host configuration file, a hypervisor or OS property or some other mechanism.

In relation to authentication, NVMe-oF supports both fabric secure channel (that includes authentication) and NVMe in-band authentication. An NVM subsystem may require a host to use fabric secure channel, NVMe in-band authentication, or both. The discovery service indicates if fabric secure channel shall be used for an NVM subsystem. The connect response indicates if NVMe in-band authentication shall be used with that controller. A controller associated with an NVM subsystem that requires a fabric secure channel shall not accept any commands (fabrics, admin, or I/O) on an NVMe Transport until a secure channel is established. Following a connect command, a controller that requires NVMe in-band authentication shall not accept any commands other than authentication commands until NVMe in-band authentication has completed.

Figure 4:
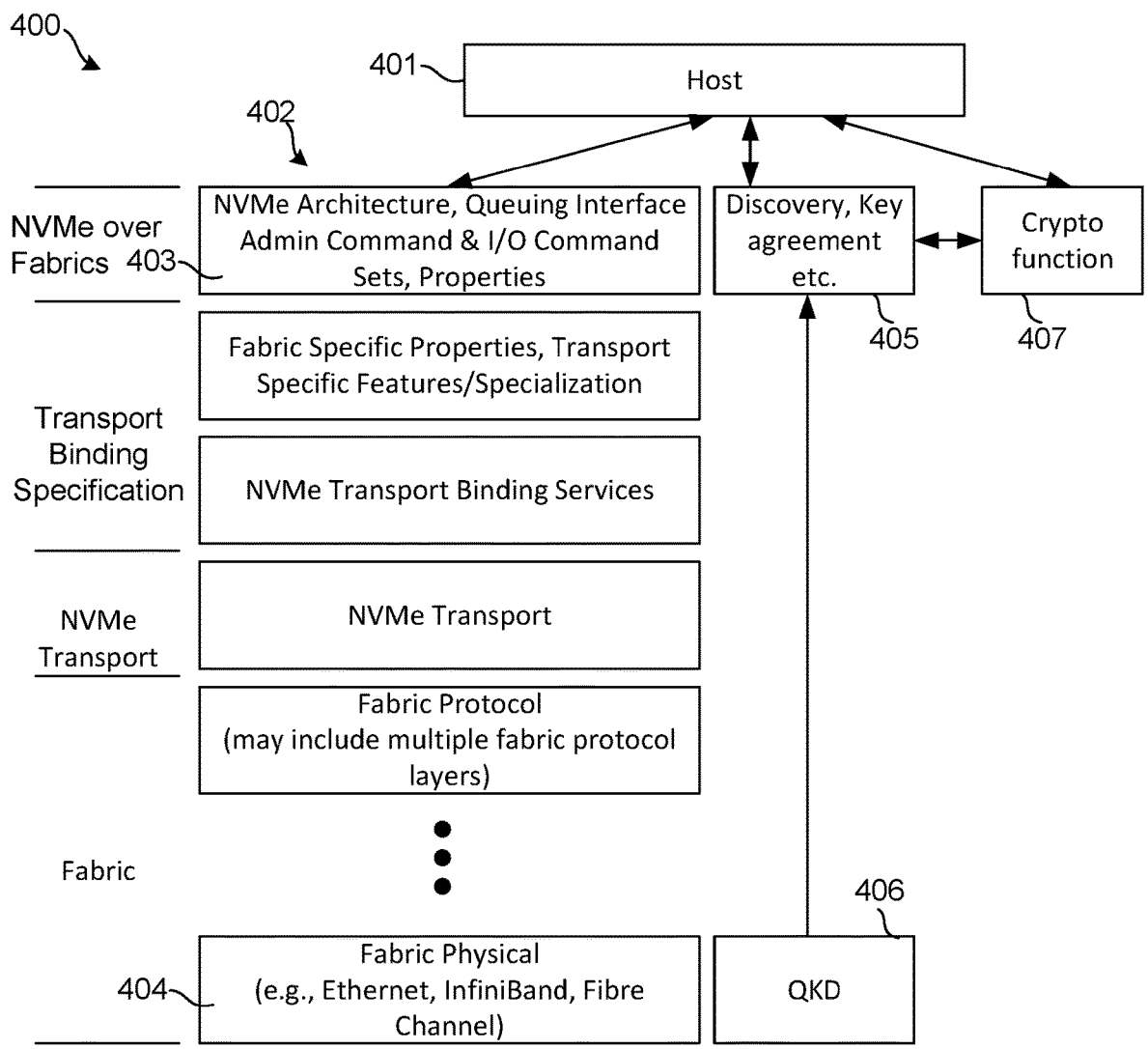
FIG. 4 illustrates Non-Volatile Memory express over Fabrics protocol, as performed by a host, according to an embodiment.

FIG. 4 illustrates the NVMe-oF protocol 400 as performed by a host 401, according to an embodiment. The protocol comprises a protocol stack 402 with multiple layers from the top level architecture layer 403 of the NVMe-oF down to a physical layer 404. The protocol now also includes additional functionality for discovery and key agreement 405. This way, host 401 can query the data storage device 100 and, as part of the discovery process, determine that the data storage device 100 has the capability of performing quantum key distribution as described above.

Once the quantum key distribution capability has been discovered, host 401 switches to the actual quantum key distribution 406 over the physical layer 404. This comprises encoding quantum information on photons that are then transmitted over the optical fiber and/or receiving photons to retrieve quantum information stored thereon. In some examples, data storage device 100 creates all required photons with quantum information encoded thereon and does not receive any photons from other communication parties as described above. In other examples, data storage device 100 receives photons and decodes quantum information, such as measuring the quantum state in one of two possible bases. This results in a key at the host 401 and the data storage device 100. As described above, key agreement may also involve the transmission of classical, digital data relating to the quantum information encoded on the photon, such as the states in which quantum information was encoded and measured. This classical communication is referred to as key agreement and is also performed by protocol element 405.

Protocol 400 further comprises a cryptographic function 407, which uses the key generated at 405. For example, cryptographic function 407 may use the key for encryption, decryption, signature calculation, and other cryptographic primitives that can be used to secure the communication channel.

Method

Figure 5:
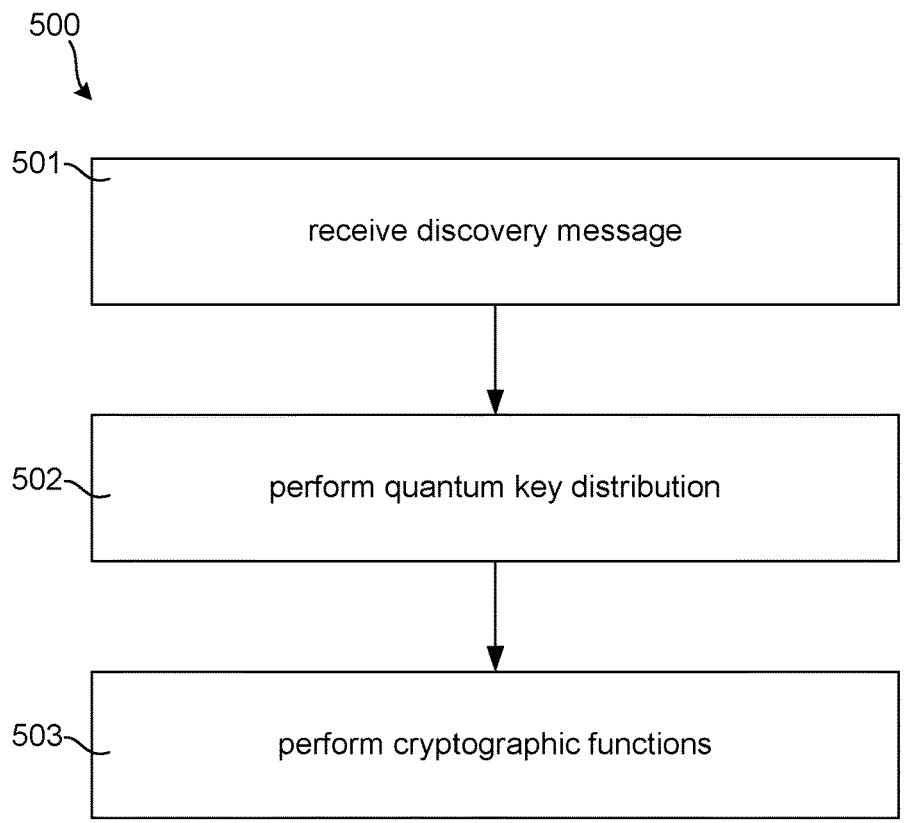
FIG. 5 illustrates a method for communicating data stored on a data storage device, as performed by a controller integrated with the data storage device, according to an embodiment.

FIG. 5 illustrates a method 500 for communicating data stored on data storage device 100 as performed by controller 103, according to an embodiment. According to method 500, controller 103 receives 501 a discovery message, such as from host 401 or other components of the fabric. The discovery message is for discovery of a key exchange capability over the optical communication link. The discovery message is sent and received over the communication link as digital data and therefore involves one or more of resonators 301, 302, 303 and one or more of detectors 311, 312, 312 and corresponding modulators.

In response to receiving the discovery message, controller 103 performs quantum key distribution over the optical communication link 300 to generate a cryptographic key at the data storage device. Instead of sending and receiving digital data, this involves sending and receiving quantum information, such as polarization of photons. The term "In response to receiving the discovery message" may involve further steps, such as responding to the host 401 that QKD is available and receiving from host 401 a request for QKD. Once it is established that controller 103 is to perform QKD, controller activates optical key distribution device 105 which directly accesses the optical communication link 300 through resonator 304. The performance of QKD is therefore on the physical layer 404 of the protocol stack 402.

Finally, controller 103 performs 503 cryptographic functions using the cryptographic key to secure data transmitted over the optical communication link. In one example, this means encrypting and decrypting user content data stored on non-volatile storage medium 102. This means the cryptographic key, which has been exchanged or generated using QKD is used for disk encryption. In further examples, controller 103 uses the cryptographic key to encrypt and decrypt communications over the optical communication link. So the cryptographic key, which has been exchanged or generated using QKD is used for communication encryption. Controller 103 may perform both methods of disk encryption and communications encryption with identical keys or perform QKD multiple times to generate multiple cryptographic keys for these functions.

Computer Architecture

Figure 6:
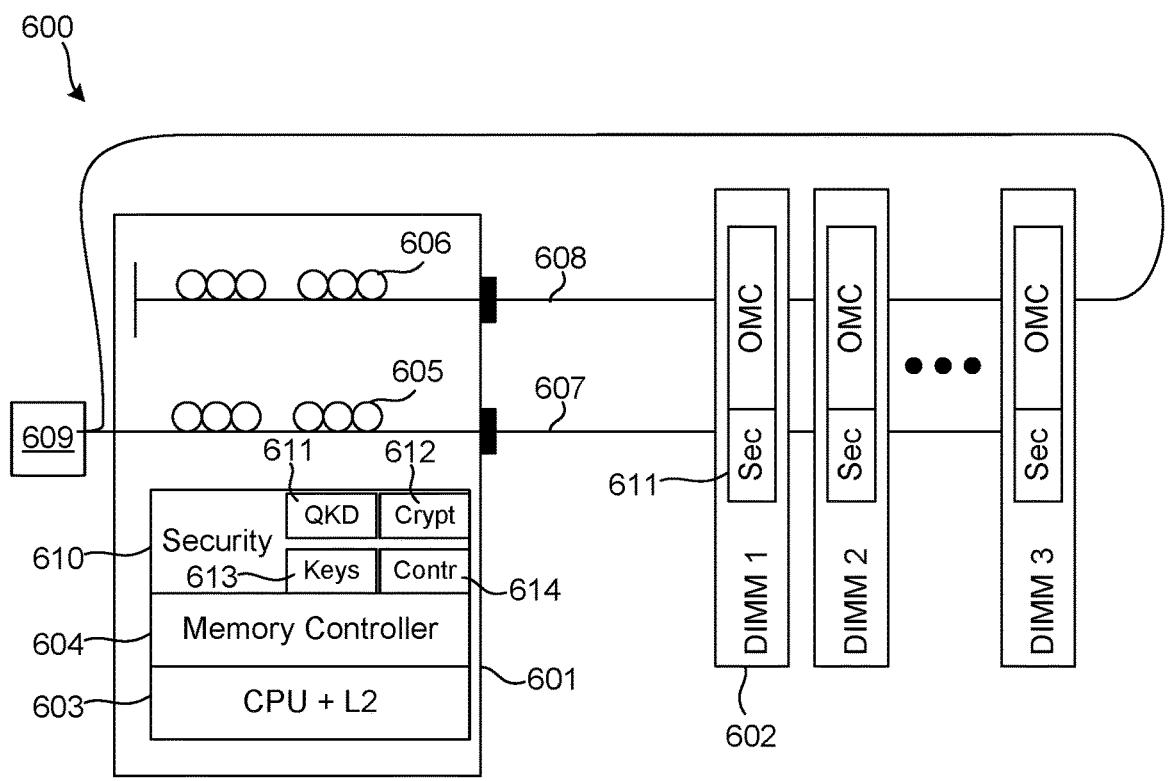
FIG. 6 illustrates a computer architecture comprising a processor and random access memory, according to an embodiment.

FIG. 6 illustrates a computer architecture 600 comprising a processor 601 and memory module 602, such as a dual in-line memory module (DIMM) comprising random access memory (RAM), according to an embodiment. There may be further DIMMs as shown in FIG. 6, which may be identical to memory module 602 and will therefore not be described further.

Processor 601 comprises a central processing unit (CPU) 603, which may also include a memory cache, and a memory controller 604. Further, there are modulators 605, detectors 606 to write and read data onto respective northbound 607 and southbound 608 optical fibers. The fiber uses an off-chip laser 609 which generates the laser light that is then modulated to transmit information. There are also corresponding modulators and detectors included in memory module 602 but not shown for clarity.

Memory controller 604 can now operate the modulators 605 and detectors 606 to read and write data stored on memory module 602. However, there is a risk that an attacker may eavesdrop on the northbound 607 and southbound 608 fiber to obtain the transmitted data. Therefore, processor 601 further comprises a security module 610 with a corresponding security module 611 in memory module 602. The security modules 610/611 comprise a quantum key distribution module 611, a cryptography engine 612, a key handling module 613 and a controller 614. The quantum key distribution module 611 is an optical key distribution device that is coupled to the northbound 607 and southbound 608 fiber as described below. So, for example, the quantum key distribution module 611 comprises a Mach-Zehnder-Modulator that encodes quantum information on photon polarization and directs photons on different paths depending on their polarization. This way, quantum key distribution module 611 generates a cryptographic key and may store the cryptographic key on volatile memory.

Cryptography engine 612 then uses the cryptographic key to encrypt communication between the processor 601 and the memory module 602. Key handling module 613 manages the process of generating keys, such that one key is generated and stored for each memory module 602. Finally, controller 614 controls the quantum key distribution module 611, the cryptography engine 612 and the key handling module 613, so that memory controller 604 can be agnostic to the operations of the security module 610 and use the memory module 602 like a regular electronic memory. The disclosure above including descriptions with reference to FIGS. 1-5 also apply to the embodiment of FIG. 6.

Host Interface

Figure 7:
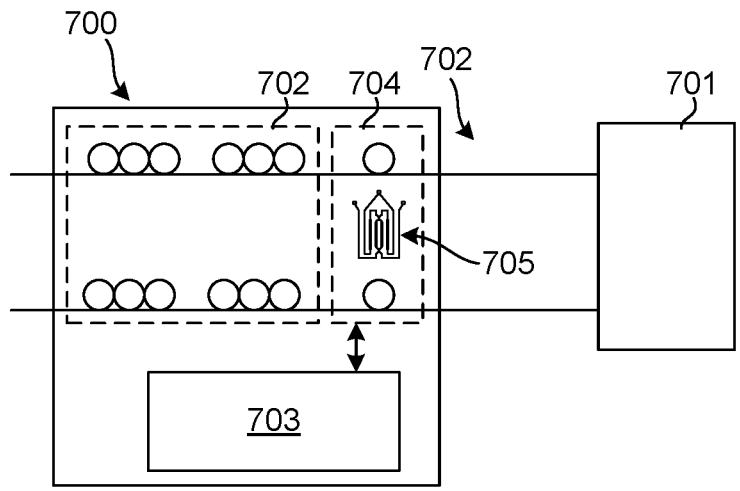
FIG. 7 illustrates a host interface, according to an embodiment.

FIG. 7 illustrates a host interface 700 that may be implemented by the components already shown in FIG. 6, according to an embodiment. Host interface 700 provide communication between a host computer 401 and a memory device 701, such as non-volatile data storage device 100, volatile random access memory module 602, or other memory devices. Host interface 700 comprises an optical data port 702 configured to connect to the memory device 701 over an optical communication link 703 external to the host interface and potentially comprising two fibers for northbound and southbound communication, respectively as shown in FIG. 6. As described before, optical data port 702 comprises detectors and modulators coupled onto communication link 703 via resonators.

Host interface 700 further comprises a cryptography engine 703 configured to use a cryptographic key to perform cryptographic operations on data sent and received through the optical data port 702. Further, host interface 700 comprises an optical key distribution device 704 that is also coupled to the optical data port 704 and configured to perform quantum key distribution over the optical communication link 702 to provide the cryptographic key to the cryptography engine 703, such as by using an MZM 705 as described above.

Figure 8:
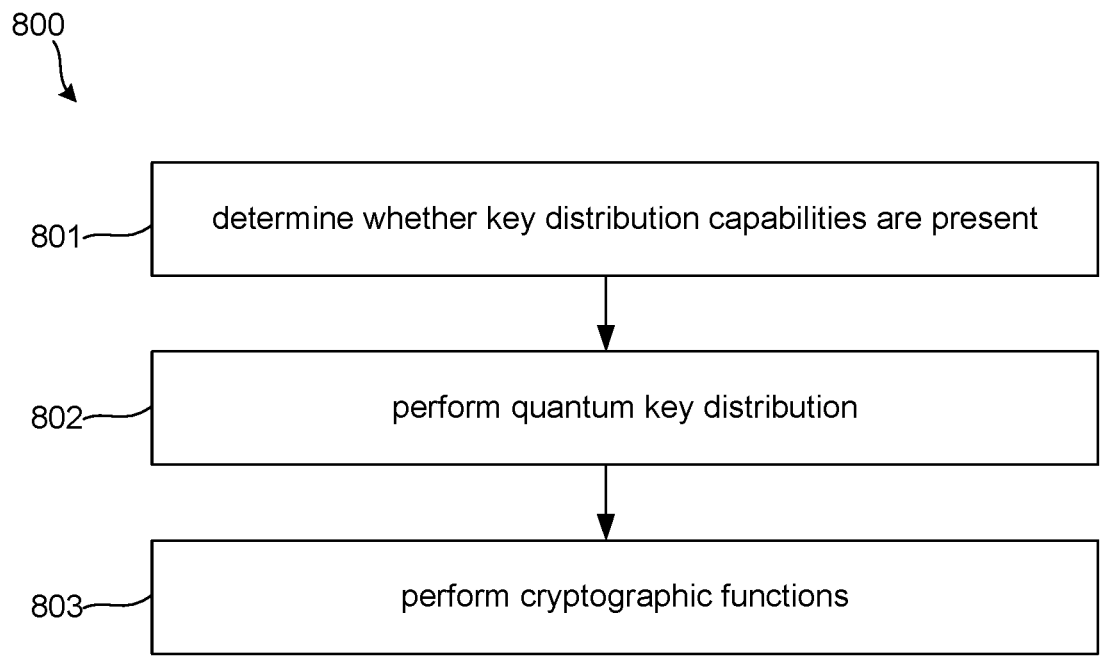
FIG. 8 illustrates a networking layer represented as a method for operating interconnected data storage devices, according to an embodiment.

FIG. 8 illustrates a method 800 for operating interconnected data storage devices, according to an embodiment. Method 800, in essence, represents a networking layer implementation, as the method 800 is performed by each node in a network or fabric of interconnected data storage devices, including host computer systems. Performing method 800, the node determines 801 whether key distribution capabilities are present at one of the interconnected data storage devices. In response to determining that the key distribution capabilities are present at one of the interconnected data storage devices, the node performs 802 quantum key distribution over the optical communication link to generate a cryptographic key pair. The key pair comprises a first key stored at a host computer and a second key stored at the one of the interconnected data storage devices. Again, the first key and the second key may be identical for a symmetric encryption method or the first and second keys may comprise a public key and a private key for asymmetric encryption.

Then, the node can perform cryptographic functions using the cryptographic key to secure data transmitted over the optical communication link. Thereby, the node secures the communication such that eavesdropping and unauthorized access to the data is made practically impossible.

Free Space Optics

While examples herein relate to communication over an optical fiber, other communication media may be used. This includes integrated waveguides for on-chip communication as well as free space optics (FSO). In FSO an optical signal is transmitted across free-space with no physical carrier (there may be air or gas present). An advantage of FSO is the high fan-out, which means that the optical signal (such as from on optical fiber) can be split into multiple beams. These beams can be identical or can be separated based on their wavelengths. The beams can be formed by an integrated optical processor that may constitute a diffraction grating to separate the wavelengths. In that example, the individual resonators 301, 302, 303 shown in FIG. 3 may not be necessary since the beam can be directed at the detectors 311, 312, 313 directly. An identical beam, or a different beam may be directed at MSM 200.

Quantum Networks

While examples herein relate to direct optical links, the disclosed devices can also be linked through a quantum network comprising zero or more repeaters.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
an optical data port configured to connect to an optical communication link external to the data storage device;
a non-volatile storage medium configured to store user content data received over the optical communication link;
a cryptography engine configured to use a cryptographic key to perform cryptographic operations comprising encrypting and decrypting data sent and received through the optical data port;
an optical key distribution device coupled to the optical data port and configured to perform quantum key distribution over the optical communication link; and
a controller configured to:
perform a protocol stack for managing storage commands received as digital data through the optical communication link to a host;
execute operations for quantum key distribution using digital data messages at a top layer of the protocol stack, wherein the operations for quantum key distribution include receiving a discovery message from the host indicating key exchange capability; and
initiate, responsive to receiving the discovery message and using the optical key distribution device, quantum key distribution through a physical layer of the optical communication link to the host, wherein:
the cryptography engine is further configured to receive the cryptographic key based on the quantum key distribution; and
initiating quantum key distribution includes switching the optical key distribution device to use the physical layer of the optical communication link to transmit quantum information for determining the cryptographic key.

2. The data storage device of claim 1, wherein the protocol stack is a remote direct memory access protocol stack for receiving commands to read the user content data from the non-volatile storage medium and write the user content data to the non-volatile storage medium.

3. The data storage device of claim 1, wherein the operations for quantum key distribution comprise features for key negotiation by exchanging digital data messages at the top layer of the protocol stack to use quantum information exchanged at the physical layer of the optical communication link.

4. The data storage device of claim 1, wherein the optical key distribution device is manufactured as an integrated silicon device.

5. The data storage device of claim 1, wherein the optical key distribution device comprises a Mach-Zehnder modulator with interleaved grating couplers.

6. The data storage device of claim 1, wherein the optical key distribution device is further configured to perform quantum key distribution based on a polarization of a photon.

7. The data storage device of claim 6, wherein the optical key distribution device is further configured to convert the polarization of the photon in the optical communication link into a path the photon takes in an integrated circuit.

8. The data storage device of claim 1, wherein the optical key distribution device is further configured to perform quantum key distribution based on coherent states.

9. A method for communicating data stored on a data storage device, the method comprising:
performing a protocol stack for managing storage commands received from a host as digital data through an optical communication link external to the data storage device;
receiving, by the data storage device and using digital data messages at a top layer of the protocol stack for the optical communication link, a discovery message for a quantum key exchange capability;
in response to receiving the discovery message:
switching an optical key distribution device in the data storage device to use a physical layer of the optical communication link to transmit quantum information for determining a cryptographic key; and
performing, using the optical key distribution device, quantum key distribution over the physical layer of the optical communication link to generate the cryptographic key at the data storage device; and
performing cryptographic functions comprising encrypting and decrypting data using the cryptographic key to secure digital data transmitted over the optical communication link.

10. The method of claim 9, wherein performing the cryptographic functions comprises encrypting and decrypting user content data stored on non-volatile memory.

11. The method of claim 9, wherein performing the cryptographic functions comprises encrypting and decrypting communications over the optical communication link.

12. The method of claim 9, wherein performing quantum key distribution comprises:
encoding quantum information onto a photon; and
transmitting the photon over the optical communication link.

13. The method of claim 12, wherein performing quantum key distribution comprises sending classical digital data over the optical communication link, the classical digital data being indicative in relation to the encoded quantum information.

14. A data storage device comprising:
an optical data port configured to connect to an optical communication link external to the data storage device;
a non-volatile storage medium configured to store user content data received over the optical communication link;
a cryptography engine configured to use a cryptographic key to perform cryptographic operations comprising encrypting and decrypting data sent and received through the optical data port;
an optical key distribution device coupled to the optical data port and configured to perform quantum key distribution over the optical communication link;
means for performing a protocol stack for managing storage commands received from a host as digital data through the optical communication link;

means for receiving, by the data storage device and using digital data messages at a top layer of the protocol stack for the optical communication link, a discovery message for a key exchange capability;

means for performing, in response to receiving the discovery message and using the optical key distribution device, quantum key distribution over a physical layer of the optical communication link to generate a cryptographic key at the data storage device, wherein the means for performing is configured to switch the optical key distribution device to use the physical layer of the optical communication link to transmit quantum information for determining the cryptographic key; and means for performing cryptographic functions using the cryptographic key to secure digital data transmitted over the optical communication link.

15. A random access memory module comprising:

an optical data port configured to connect to an optical communication link external to the random access memory module;

a volatile random access memory configured to store user content data received over the optical communication link;

a cryptography engine configured to use a cryptographic key to perform cryptographic operations comprising encrypting and decrypting data sent and received through the optical data port;

an optical key distribution device coupled to the optical data port and configured to perform quantum key distribution over the optical communication link; and a controller configured to:
  perform a protocol stack for managing memory commands received as digital data through the optical communication link to a memory controller;
  execute operations for quantum key distribution using digital data messages at a top layer of the protocol stack, wherein the operations for quantum key distribution include receiving a discovery message from a host indicating key exchange capability; and
  initiate, responsive to receiving the discovery message and using the optical key distribution device, quantum key distribution through a physical layer of the optical communication link to the memory controller, wherein:
    the cryptography engine is further configured to receive the cryptographic key based on the quantum key distribution; and
    initiating quantum key distribution includes switching the optical key distribution device to use the physical layer of the optical communication link to transmit quantum information for determining the cryptographic key.

16. A host interface to provide communication between a host computer and a memory device, the host interface comprising:

an optical data port configured to connect to the memory device over an optical communication link external to the host interface;

a cryptography engine configured to use a cryptographic key to perform cryptographic operations comprising encrypting and decrypting data sent and received through the optical data port;

an optical key distribution device coupled to the optical data port and configured to perform quantum key distribution over the optical communication link; and a controller configured to:
  perform a protocol stack for managing memory commands received as digital data through the optical communication link to the memory device;
  execute operations for quantum key distribution using digital data messages at a top layer of the protocol stack, wherein the operations for quantum key distribution include receiving a discovery message from the host computer indicating key exchange capability; and
  initiate, responsive to receiving the discovery message and using the optical key distribution device, quantum key distribution through a physical layer of the optical communication link to the memory device, wherein:
    the cryptography engine is further configured to receive the cryptographic key based on the quantum key distribution; and
    initiating quantum key distribution includes switching the optical key distribution device to use the physical layer of the optical communication link to transmit quantum information for determining the cryptographic key.

17. A method for operating interconnected data storage devices, the method comprising:

performing a protocol stack for managing storage commands communicated as digital data through an optical communication link between and external to the interconnected data storage devices;

determining, using digital data messages at a top layer of the protocol stack, whether key distribution capabilities are present at one of the interconnected data storage devices;

in response to determining that the key distribution capabilities are present at one of the interconnected data storage devices:
  switching an optical key distribution device in the interconnected data storage devices to use a physical layer of the optical communication link to transmit quantum information for determining a cryptographic key; and
  performing, using the optical key distribution device, quantum key distribution over the physical layer of the optical communication link to generate a cryptographic key pair comprising a first key stored at one of the interconnected data storage devices and a second key stored at another of the interconnected data storage devices, wherein the optical key distribution device uses the physical layer of the optical communication link to transmit quantum information for generating the cryptographic key pair; and performing cryptographic functions comprising encrypting and decrypting data sent over the optical communication link using the cryptographic key pair to secure digital data transmitted over the optical communication link.

18. The method of claim 17, wherein performing quantum key distribution comprises transmitting a photon with quantum information encoded thereon over the optical communication link.

19. The method of claim 18, wherein performing quantum key distribution comprises transmitting classical, digital data relating to the quantum information encoded on the photon.

* * * * *